United States Patent
Laroia et al.

(10) Patent No.: US 7,991,374 B2
(45) Date of Patent: Aug. 2, 2011

(54) METHODS AND APPARATUS FOR SUPPORTING COMMUNICATIONS USING HORIZONTAL POLARIZATION AND DIPOLE ANTENNAS

(75) Inventors: Rajiv Laroia, Far Hills, NJ (US); Vikram Reddy Anreddy, Bridgewater, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 12/044,966

(22) Filed: Mar. 8, 2008

(65) Prior Publication Data

US 2009/0224983 A1    Sep. 10, 2009

(51) Int. Cl.
H04B 7/00 (2006.01)
H04B 17/02 (2006.01)

(52) U.S. Cl. .................. 455/273; 455/137; 455/277.1

(58) Field of Classification Search .............. 455/130, 455/132, 137, 222, 226.1, 272, 273, 277.1, 455/277.2, 65, 506; 342/361, 362
See application file for complete search history.

(56) References Cited

U.S. PATENT DOCUMENTS

| | | | | |
|---|---|---|---|---|
| 5,691,727 A | * | 11/1997 | Cyzs | 342/361 |
| 5,898,362 A | * | 4/1999 | Ibanez-Meier et al. | 370/320 |
| 6,205,337 B1 | | 3/2001 | Boch | |
| 6,546,236 B1 | * | 4/2003 | Canada et al. | 455/304 |
| 6,980,806 B2 | | 12/2005 | Muramoto et al. | |
| 7,359,675 B2 | | 4/2008 | Lastinger et al. | |
| 7,483,718 B2 | * | 1/2009 | Catreux-Erceg et al. | 455/562.1 |
| 2006/0252461 A1 | | 11/2006 | Grant et al. | |

FOREIGN PATENT DOCUMENTS

| | | |
|---|---|---|
| EP | 1770874 | 4/2007 |
| GB | 2401994 | 11/2004 |
| WO | WO2005060574 | 7/2005 |

OTHER PUBLICATIONS

International Search Report and Written Opinion—PCT/US2009/035037, International Search Authority—European Patent Office—May 18, 2009.

* cited by examiner

*Primary Examiner* — Sonny Trinh
(74) *Attorney, Agent, or Firm* — Semion Talpalatsky (57) ABSTRACT

Methods and apparatus for supporting the communication of an information stream using an individual polarization type are described. For example, a first data stream is communicated from a base station sector transmitter using horizontal polarization signals and a second data stream is communicated using vertical polarization signals. A mobile wireless communications device, employing a plurality of dipole antennas associated with different direction polarizations, e.g., a first direction horizontal polarization dipole antenna, a second direction horizontal polarization dipole antenna and a vertical polarization dipole antenna, multiple receiver modules, and a combiner module, facilitates the recovery of horizontal polarization signals without the need for azimuth antenna orienting or repositioning, and also facilitates the recovery of vertical polarization signals. The first data stream associated with horizontal polarization may be, and sometimes is, transmitted concurrently with the second data stream associated with vertical polarization using the same time/frequency air link resources, e.g., segment.

27 Claims, 5 Drawing Sheets

PRIOR ART

FIGURE 1

PRIOR ART

SINGLE DIPOLE ANTENNA
HORIZONTAL POLARIZATION
ANTENNA PATTERN

METHODS AND APPARATUS FOR SUPPORTING COMMUNICATIONS USING HORIZONTAL POLARIZATION AND DIPOLE ANTENNAS

FIELD

Various embodiments relate to wireless communications systems, and more particularly to methods and apparatus of using antennas having different polarizations.

BACKGROUND

In Multiple-input and multiple-output (MIMO) multiple antennas are normally used at both the transmitter and receiver to improve the performance of radio communications. In a MIMO system vertically and horizontally polarized dipole antennas may be used to receive and/or transmit vertically and horizontally polarized electromagnetic waves, respectively. In theory the use of two dipole antennas, one horizontal and one vertical should allow for successful recovery of vertically and horizontally polarized signals. However, the combination has proven less than ideal under real world conditions encountered by mobile wireless devices.

Figure 1:
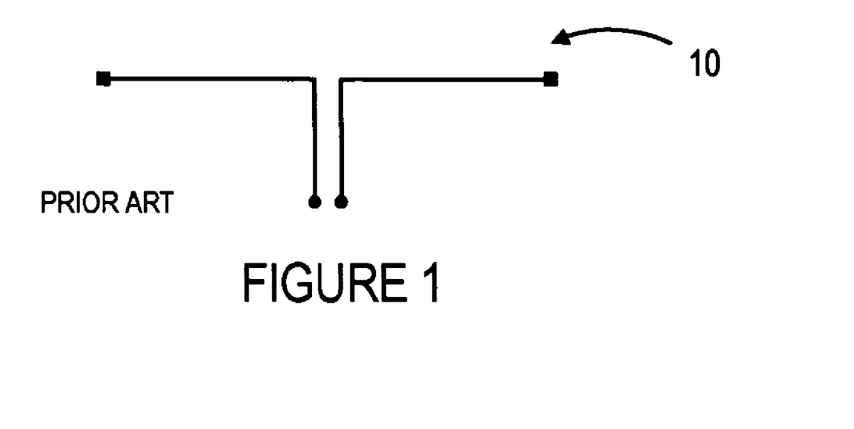
FIG. 1 is a drawing of a prior art dipole antenna.
Figure 2:
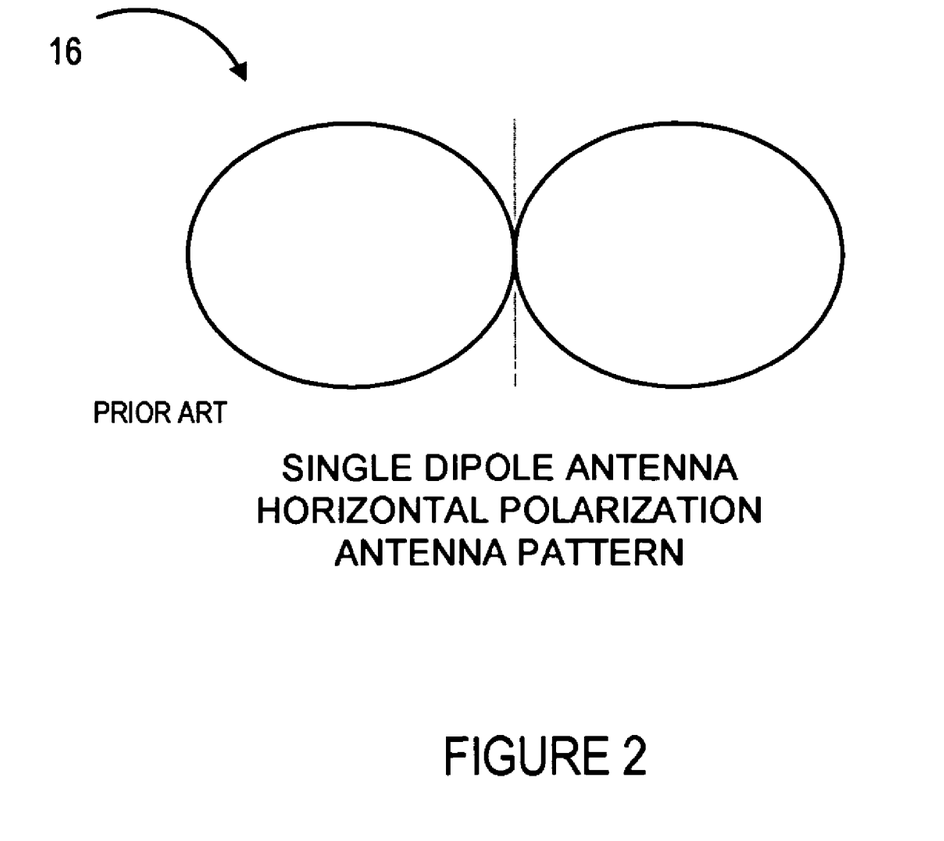
FIG. 2 is a drawing of an azimuth directivity pattern for the dipole antenna of FIG. 1.

Some of the problems with the use of dipole antennas can be appreciated from the diagram of FIG. 2 which shows the azimuth directivity pattern 16 for a horizontal dipole antenna such as the antenna 10 shown in FIG. 1. While the directivity pattern of a vertical dipole antenna is omni-directional in the horizontal plane, the corresponding pattern of a horizontal dipole varies considerably with the angle of incidence, as shown in FIG. 2. Note that the horizontal dipole cannot receive or transmit a wave from or in the direction it is pointing to as illustrated by the presence of nulls in the antenna pattern. Given the limitations of the dipole antenna in the horizontal direction, a successful transmission and/or reception operation may require the user and/or some mechanical apparatus, to orient the horizontal dipole in such a way that its broadside points to the direction of the receiver/transmitter device with which communication is attempting to be achieved. It should be appreciated that this approach is not very user friendly and can be relatively expensive when the rotation processes is implemented using a motor or other automated process.

In view of the above discussion, it would be desirable if improved methods and apparatus could be developed to provide antenna diversity in terms of both horizontal and vertical polarized antennas being supported but without the need to rotate or otherwise mechanically reorient a dipole antenna to achieve suitable reception/transmission characteristics relative to the position of another device with which communication is being attempted.

SUMMARY

Methods and apparatus for supporting the communication of an information stream using an individual polarization type are described. For example, a first data stream is communicated from a base station sector transmitter to one or more wireless terminals using horizontal polarization signals, and a second data stream is communicated to one or more wireless terminals using vertical polarization signals. A mobile wireless communications device, employing two dipole antennas associated with different direction polarizations, e.g., a first direction horizontal polarization dipole antenna and a second direction horizontal polarization dipole antenna, two receiver chains, and a combiner module, e.g., a maximum ratio combiner module or a minimum mean squared combiner module, facilitates the reception of horizontal polarization signals and the recovery of the first data stream without the need for azimuth antenna orienting or repositioning.

In some embodiments, the wireless terminal further includes a third dipole antenna associated with a different polarization direction, e.g., a vertical dipole antenna, and a third receiver chain which facilitates the reception of vertical polarization signals and the recovery of the second data stream. The first data stream associated with horizontal polarization may be, and sometimes is, transmitted concurrently with the second data stream associated with vertical polarization using the same time/frequency air link resources, e.g., segment. In some embodiments, a wireless terminal selects and controls its operational mode to recover (i) a stream corresponding to horizontal polarization, (ii) a stream corresponding to vertical polarization, or (iii) both a stream corresponding to horizontal polarization concurrently with a stream corresponding to vertical polarization.

An exemplary wireless communications device, in accordance with some embodiments includes: a first antenna being polarized in a first direction; a first receiver processing module coupled to said first antenna; a second antenna being polarized in a second direction which is different from the first direction; a second receiver processing module coupled to the second antenna; and a signal combining module for combining a first signal recovered by said first receiver processing module and a second signal recovered by said second receiver processing module. In some embodiments, the first and second polarization directions are different by at least 45 degrees, and the second receiver processing module includes a phase shift module. In some embodiments, the first and second polarization directions are different by 90 degrees, and the second receiver processing module includes a phase shift module. In various embodiments, the combiner module is one of a maximal ratio combining module and a minimum means squared combining module, and the combiner module is used in recovering a data stream communicated using horizontal polarization.

An exemplary method of operating a wireless communications device, in accordance with some embodiments, comprises: receiving a first signal on a first antenna polarized in a first direction; processing the received first signal using a first receiver processing module to generate a first digital signal; receiving a second signal on a second antenna polarized in a second direction; processing the second received signal to generate a second digital signal; and combining the first digital signal and the second digital signal to recover a first transmitted signal. In some such embodiments, the first and second directions are polarization directions which differ by at least 45 degrees and the recovered first transmitted signal is a data stream communicated using horizontal polarization. In some such embodiments, the first and second directions are polarization directions which differ by 90 degrees and the recovered first transmitted signal is a data stream communicated using horizontal polarization.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 3:
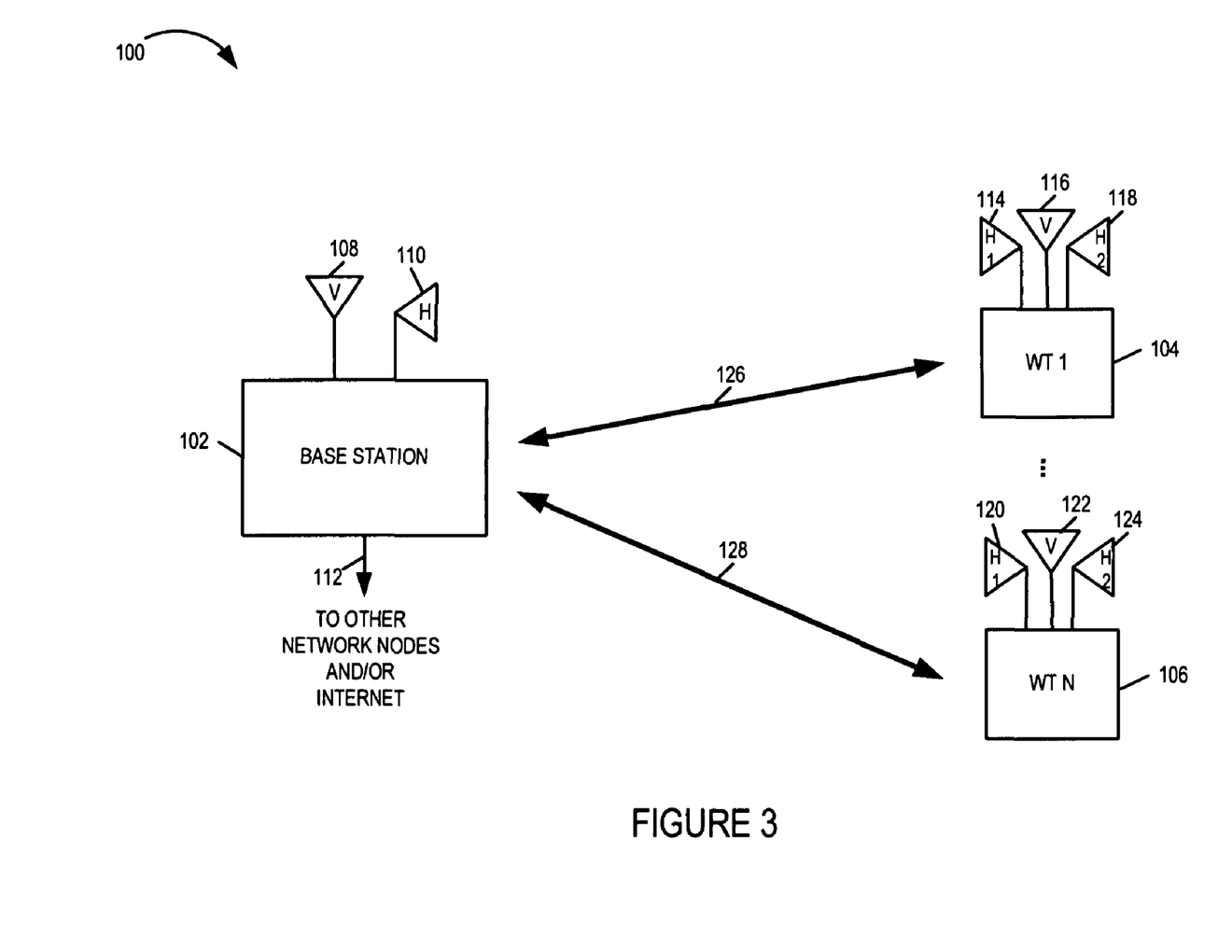
FIG. 3 is a drawing of an exemplary communications system in accordance with an exemplary embodiment.

FIG. 3 is a drawing of an exemplary communications system 100 in accordance with an exemplary embodiment. Exemplary communications system 100 includes a base station 102 and a plurality of wireless terminals (WT 1 104, . . . , WT N 106). Base station 102 includes a vertical polarization antenna 108 and a horizontal polarization antenna 110. Antenna pair 108, 110 may, and sometimes does, correspond to a sector of the base station. WT 1 104 includes a first horizontal polarization antenna 114, a second horizontal polarization antenna 118 and a vertical polarization antenna 116. Similarly, WT N 106 includes a first horizontal polarization antenna 120, a second horizontal polarization antenna 124 and a vertical polarization antenna 122. The horizontal polarization antennas for an individual wireless terminal, e.g., antenna pair 114, 118 corresponding to WT 1 104 are, e.g., electrical dipole antennas which are positioned such that the polarization direction patterns associated with the two antennas are different from each other by 90 degrees. In some embodiments, the horizontal polarization antennas for an individual wireless terminal are electrical dipole antennas which are positioned such that the polarization direction patterns associated with the two antennas are different from each other by at least 45 degrees. By using the pair or horizontal polarization antennas in a coordinated manner to receive and/or transmit, the wireless terminal can communicate with the horizontal polarization antenna 110 of base station 102, without having to perform azimuth pointing of the wireless terminal. Thus wireless terminal 104 does not need complex and expensive direction determination functionality and antenna positioning functionality, yet is able to benefit from supporting horizontal and vertical polarization signaling. Thus the two horizontal antennas (114, 118) with a phase difference provide, in combination, a more inclusive coverage pattern which does not have the typical azimuth null regions associated with using a single direction horizontal polarization dipole antenna in the wireless terminal. WT 1 104 communicates with base station 102 via wireless link 126 while WT N 106 communicates with base station 102 via wireless link 128. This exemplary embodiment supports independent data streams being conveyed concurrently using different polarization directions, e.g., vertical and horizontal polarizations, using the same air link resource, e.g., same time/frequency resource or segment.

Base station 102 is also coupled via network link 112 to other network nodes, e.g., other base stations, AAA nodes, homes agent nodes, routers, system control nodes, etc., and/or the Internet.

Figure 4:
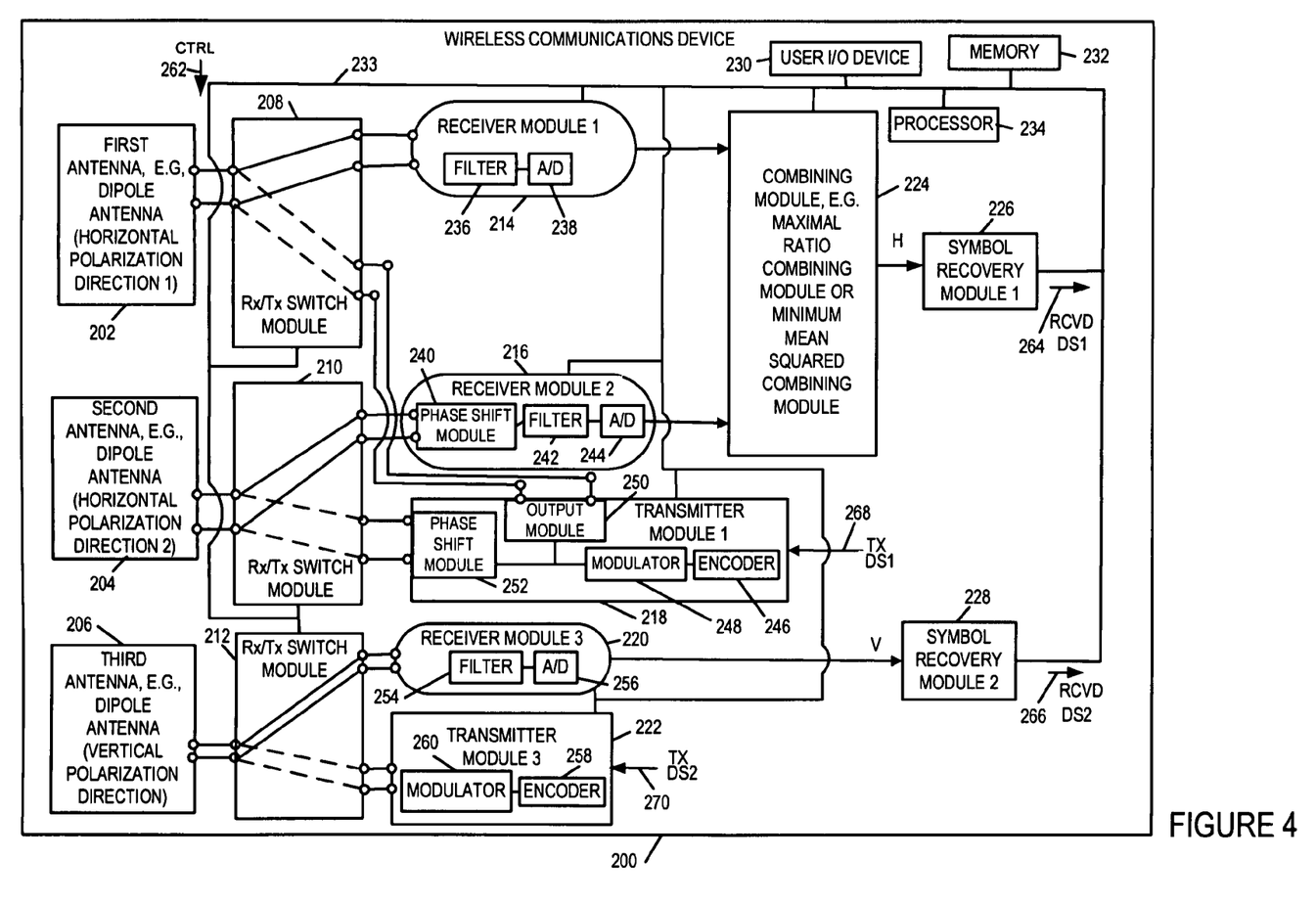
FIG. 4 is a drawing of an exemplary wireless communications device, e.g., a mobile node, in accordance with an exemplary embodiment.

FIG. 4 is a drawing of an exemplary wireless communications device 200, e.g., a mobile node, in accordance with an exemplary embodiment. Exemplary wireless communications device 200 is, e.g., a portable handheld communications device. Wireless communications device 200 is, e.g., one of (WT 1 104, . . . , WT N 106) of system 100 of FIG. 1. Wireless communications device 200 includes a first antenna 202, e.g., a first dipole antenna associated with a first horizontal polarization direction, a second antenna 204, e.g., a second dipole antenna associated with a second horizontal polarization direction, and a third antenna 206, e.g., a third dipole antenna which is associated with a vertical polarization direction. In some embodiments, the first antenna 202 is polarized in a first direction; the second antenna 204 is polarized in a second direction, and the first direction is 90 degrees from the second direction. In some such embodiments, the third antenna is polarized in a third direction which is 90 degrees from the first and second directions. In some embodiments, the first antenna 202 is polarized in a first direction; the second antenna 204 is polarized in a second direction, and the first direction is at least 45 degrees from the second direction. In some such embodiments, the third antenna is polarized in a third direction which is at least 45 degrees from the first and second directions. In some embodiments, there is an angle of 90+/−45 degrees between the first direction and second direction. In some embodiments, there is an angle of 90+/_45 degrees between the third direction and the first direction, and there is an angle of 90+/−45 degrees between the third direction and the second direction. Wireless communications device 200 also includes a first Rx/Tx switching module 208 coupled to the first antenna 202, a second Rx/Tx switching module 210 coupled to the second antenna 204, and a third Rx/Tx switching module 212 coupled to the third antenna 206. Device 200 also includes a first receiver module 214, e.g., a first RF processing module, a second receiver module 216, e.g., a second RF processing module, a first transmitter module 218, a third receiver module 220, e.g., a third RF processing module, a second transmitter module 222, a combining module 224, a first symbol recovery module 226, a second symbol recovery module 228, a processor 234, user I/O devices 230, and memory 232 coupled together via a bus 233. The Rx/Tx switch modules (208, 210, 212) are also coupled to bus 233. The various elements (208, 210, 212, 214, 216, 218, 220, 222, 224, 226, 228, 230, 232) may interchange data and information over bus 233.

User I/O devices 230 include, e.g., microphone, keyboard, keypad, switches, camera, speaker, display, etc. User I/O devices 230 allow an operator of wireless device 200 to input data/information, access output data/information and control at least some functions of the communications device 200.

Figure 5:
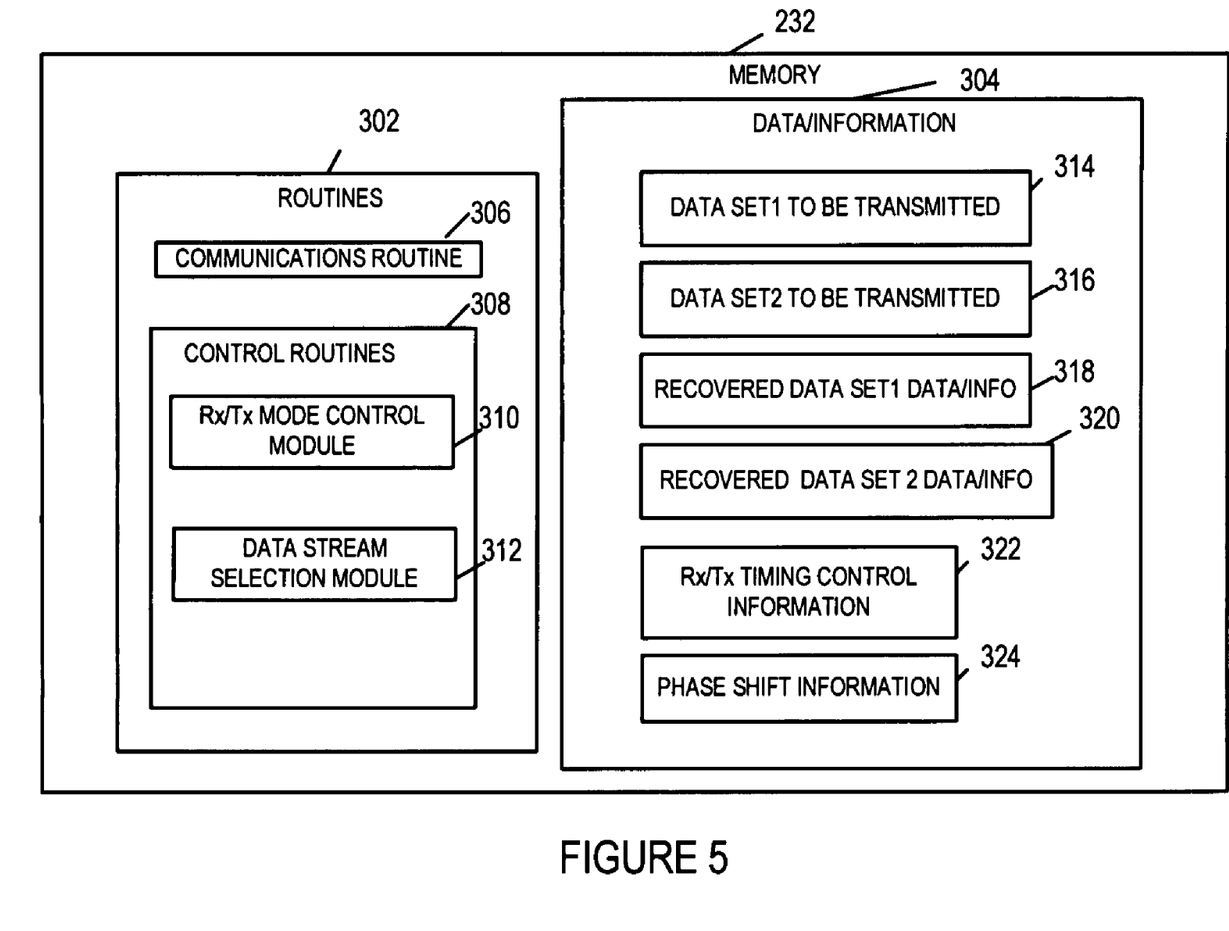
FIG. 5 is a drawing of an exemplary memory which may be included in the exemplary communications device of FIG. 4.

Memory 232, which is illustrated in more detail in FIG. 5, includes routines 302 and data/information 304. The routines 302 include a communications routine 306 and control routines 308. The communications routine 306 implements the various communications protocols used by the wireless communications device 200. The control routines 308 include an Rx/Tx mode control module 310 and a data stream selection module 312. The data/information 304 includes data set 1 data/information to be transmitted 314, data set 2 data/information to be transmitted 316, recovered data set 1 data/information 318, recovered data set 2 data/information 320, Rx/Tx timing control information 322 and phase shift information 324.

Figure 6:
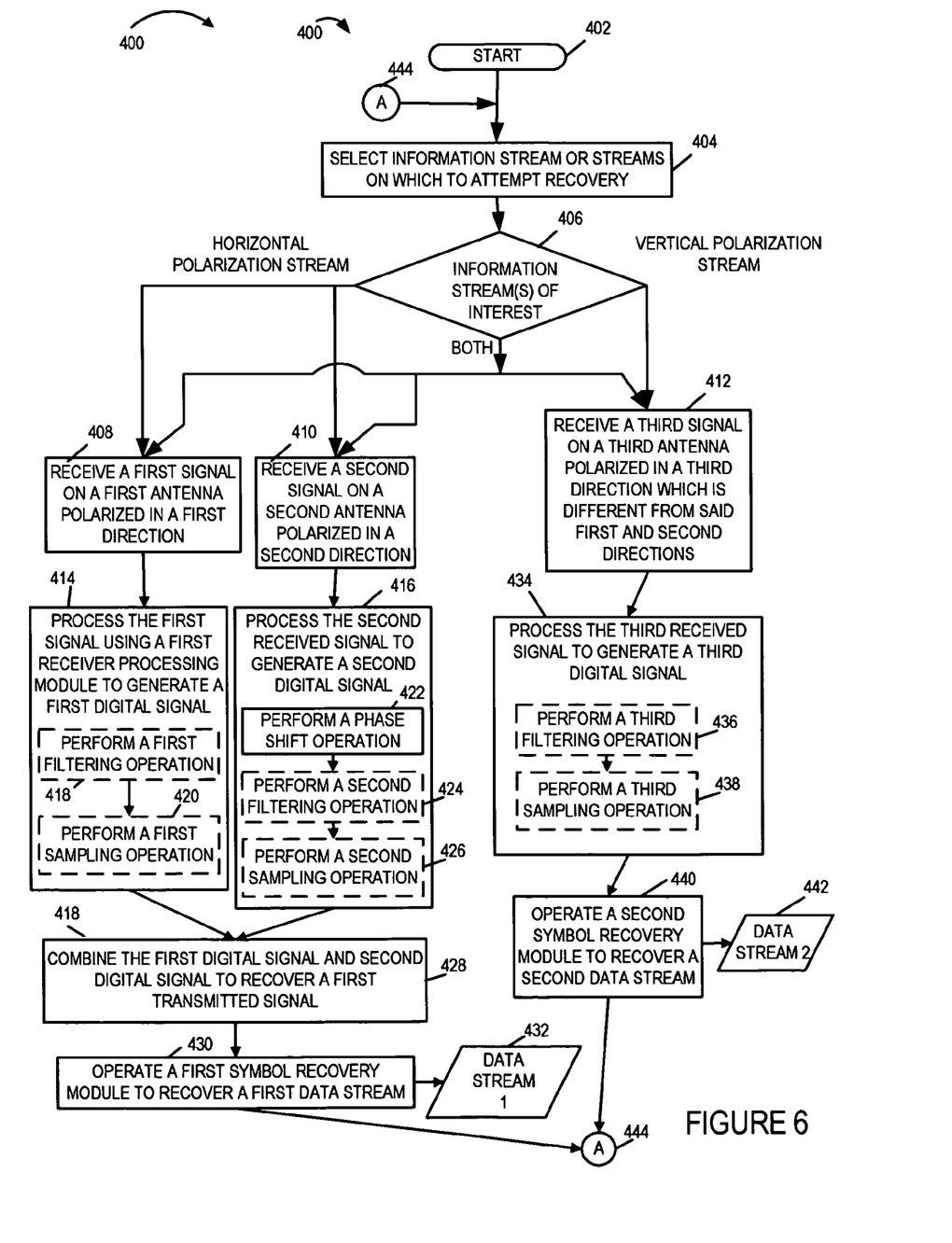
FIG. 6 is a drawing of an exemplary method of operating a wireless communications device in accordance with an exemplary embodiment.

Processor 234, e.g., a CPU, executes the routines 302 and uses the data/information 304 in memory 232 to control the operation of the wireless communications device 200 and implement methods, e.g., the method of flowchart 400 of FIG. 6.

Rx/Tx mode control module 310 controls the communications device 200 to be in a receive mode or a transmit mode, e.g., in accordance with a predetermined TDD timing structure included in information 322. Rx/Tx mode control module 310 generates control signal 262 which is communicated to Rx/Tx switching modules (208, 210, 212) to control the antennas (202, 204, 206) to be coupled to inputs of receiver modules (214, 216, 220), respectively, or to outputs of transmitter modules (218, 218, 222), respectively. Note that when in the transmit mode, a first output from output module 250 of transmitter module 1 218 can be, and sometimes is, coupled to first antenna 202 and a second output from phase shift module 252 of transmitter module 1 218 is coupled to second antenna 204.

Data stream selection module 312 selects whether the communications device 200 is to communicate, for a given interval, using horizontal polarization, vertical polarization or using both vertical and horizontal polarization. Different modules within wireless communications device 200, may be, and sometimes are disconnected, deactivated, powered down, and/or placed in a standby state as a function of a decision of the data stream selection module 312, e.g., to conserve battery power. For example, consider that the interval is to be a receive interval and the data stream selection module 312 selects to receive using only horizontal polarization. Under such a scenario, in some embodiments, transmitter module 1 218, receiver module 3 220, transmitter module 3 222, and symbol recovery module 2 228 are deactivated or powered down while receiver module 1 214, receiver module 2 216, combining module 224, and symbol recovery module 1 226 are powered on, operational, and utilized.

Exemplary reception will now be described with regard to a horizontal polarization downlink data stream. Rx/Rx switch modules (208, 210) are controlled to be switched for reception such that first antenna 202 is coupled to the input of receiver module 1 214, via Rx/Tx switch module 208, and second antenna 204 is coupled to the input of receiver module 2 216 via Rx/Tx switch module 210. Receiver module 1 214 includes a filter 236 and an analog to digital convertor 238. Receiver module 2 216 includes a phase shift module 240, a filter 244 and an analog to digital convertor 244. In some embodiments, the phase shift module 252 is separate from receiver module 2, e.g., as a pre-processing unit. A horizontal polarization signal is received via first antenna 202 and processed by receiver module 1 214 in which filter 236 filters the analog, removing noise and out-out of band signals, and then A/D 238 processes the filtered signal and outputs a digital signal which is fed as a first input to combining module 224. A horizontal polarization signal is received via second antenna 204 and processed by receiver module 2 216. In receiver module 2 216, phase shift module 240 phase shifts the received signal, e.g., by 90 degrees; then filter 242 filters the phase shifted analog signal, removing noise and out-out of band signals, and then A/D 244 processes the filtered signal and outputs a digital signal which is fed as a second input to combining module 224. The combining module 224, e.g., a maximum ratio combining module or a minimum mean squared combing module, combines the two inputs and outputs a recovered digital signal corresponding to a horizontal polarization communication stream. The output of combining module 224 is fed as input to symbol recovery module 1 226 which recovers received data symbol stream 1 264.

Exemplary reception will now be described with regard to a vertical polarization downlink data stream. Rx/Tx switch module 212 is controlled to be switched for reception such that third antenna 206 is coupled to the input of receiver module 3 220, via Rx/Tx switch module 212. Receiver module 3 220 includes a filter 254 and an analog to digital convertor 256. A vertical polarization signal is received via third antenna 206 and processed by receiver module 3 220 in which filter 254 filters the analog signal removing noise and out-out of band signals, and then A/D 256 processes the filtered signal and outputs a digital signal which is fed as an input to symbol recovery module 2 228 which recovers received data symbol stream 2 266.

Exemplary transmission will now be described with regard to a horizontal polarization uplink data stream. Rx/Tx switch modules (208, 210) are controlled to be switched for transmission such that first antenna 202 is coupled to the non-phase shifted output module 250 of transmitter module 1 218, via Rx/Tx switch module 208, and second antenna 204 is coupled to the phase shifted output of phase shift module 252 of transmitter module 1 218. Transmitter module 1 214 includes an encoder 246, a modulator 248, an output module 250 and phase shift module 252. Transmission data stream 1 268 information is fed as input to the encoder 246, which encodes the information to be communicated, e.g., generating coded bits, and then modulator 248 generates an analog signal including modulation symbols conveying the coded bits. The output of the modulator 248 goes to both output module 250 and phase shift module 252. Output module 250, e.g., an amplifier stage, processes the signal from modulator 248 and feeds the processed signal to first antenna 202 via which the signal is transmitted, e.g., to a base station. Phase shift module 252, e.g., an output stage including phase shifting and amplification, processes the signal from modulator 248 and feeds the processed signal to second antenna 204 via which the signal is transmitted. In some embodiments, the amount of phase shift between the processed output signal from module 250 and from module 252 is 90 degrees. In some embodiments, phase shift module 252 is located external to transmitter module 1 218.

Exemplary transmission will now be described with regard to a vertical polarization uplink data stream. Rx/Tx switch module 212 is controlled to be switched for transmission such that third antenna 206 is coupled to the output of transmitter module 3 222. Transmitter module 3 222 includes an encoder module 258 and a modulator module 260. Transmission data stream 2 270 information is fed as input to the encoder 258, which encodes the information to be communicated, e.g., generating coded bits, and then modulator 260 generates an analog signal including modulation symbols conveying the coded bits. The output of the modulator 260 goes to the third antenna 206, which transmits the generated signal, e.g., to a base station.

FIG. 6 is a flowchart 400 of an exemplary method of operating a wireless communications device, e.g., device 200 of FIG. 4, in accordance with an exemplary embodiment. Operation starts in step 402, where the communications device is powered on and initialized and proceeds to step 404. In step 404 the wireless communications device selects an information stream or streams on which to attempt recovery of signals from the base station. Operation proceeds from step 404 to step 406.

In step 406, if the selection of step 404 is to recover the horizontal polarization stream, then operation proceeds from step 406 to steps 408 and 410 which are performed in parallel. Alternatively, in step 406, if the selection of step 404 is to recover the vertical polarization stream, then operation proceeds from step 406 to step 412. As another alternative, if the selection of step 404 is to recover both the horizontal and vertical polarization streams, then operation proceeds from step 406 to steps 408, 410 and 414 which are performed in parallel.

In step 404, the communications device receives a first signal on a first antenna polarized in a first direction, e.g., first dipole antenna 202 polarized in a first horizontal polarization direction. Operation proceeds from step 408 to step 414, in which the communications device processes the first signal using a first receiver processing module, e.g., receiver module 1 214, to generate a first digital signal. In some embodiments, step 414 includes sub-step 418 and/or sub-step 420. In sub-step 418 a filtering module, e.g., filter 236, performs a filtering operation and in sub-step 420 a first sampling operation is performed, e.g., by A/D module 238.

Returning to step 410, in step 410, the communications device receives a second signal on a second antenna polarized in a second direction, e.g., second dipole antenna 204 polarized in a second horizontal polarization direction which varies from the first horizontal direction by 90 degrees. In some embodiments, the second dipole antenna 204 is polarized in a second horizontal polarization direction which varies from the first horizontal direction by at least 45 degrees. In some embodiments, there is an angle of 90+/−45 degrees between the first polarization direction associated with the first dipole antenna direction and the second direction associated with the second dipole antenna. Operation proceeds from step 410 to step 416, in which the communications device processes the second signal using a second receiver processing module, e.g., receiver module 2 216, to generate a second digital signal. The step of processing the second received signal to generate a second digital signal includes sub-step 422 in which a phase shift operation is performed, e.g., phase shift module 240 performs a phase shift of 90 degrees on the received second signal. In some embodiments, step 416 also includes sub-step 424 and/or sub-step 426. In sub-step 424 a filtering module, e.g., filter 242, performs a first filtering operation and in sub-step 426 a second sampling operation is performed, e.g., by A/D module 244. Operation proceeds from steps 414 and 416 to step 428.

In step 428, a combining module, e.g., combining module 224 which is, e.g., a maximum ratio combiner module or a minimum mean squared combining module, combines the first and second digital signals to recover a first transmitted signal, e.g., a transmitted signal being communicated using horizontal polarization. Operation proceeds from step 428 to step 430. In step 430 a first symbol recovery module, e.g., symbol recovery module 1 226, is operated to recover a first data stream, data stream 1 432, which may be received DS 1 264 of FIG. 2.

Returning to step 412, in step 412 the communications device receives a signal on a third antenna polarized in a third direction which is different from the first and second polarization directions, e.g., antenna 206 which is dipole antenna associated with a vertical polarization direction. In some embodiments, the third direction is 90 degrees from the first and second directions. In some embodiments, the third direction is at least 45 degrees from the first and second directions. In some embodiments there is an angle of 90+/−45 degrees between the third direction and first direction, and there is an angle of 90+/−45 degrees between the third direction and the second direction. Operation proceeds from step 412 to step 434, in which a third receiver module, e.g., receiver module 3 220, is operated to process the received third signal to generate a third digital signal. In various embodiments step 434 includes one or more of sub-steps 436 and 438. In sub-step 436 a filtering operation is performed on the signal received via the third antenna, e.g., by filter 254. In sub-step 438 a sampling operation is performed on the filtered signal, e.g., by A/D convertor 256, as part of the conversion. Then in step 440, a second symbol recovery module, e.g., symbol recovery module 2 228 is operated to recover a second data stream, data stream 2 442 which may be received DS 2 266 of FIG. 4.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, receiving a first signal on a first antenna polarized in a first direction, processing the receiving first signal, combining first and second digital signals, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Some embodiments are directed to a device, e.g., communications device, including a processor configured to implement one, multiple or all of the steps of one or more methods of the invention. In some embodiments, the processor or processors, e.g., CPUs, of one or more devices, e.g., communications devices such as wireless terminals are configured to perform the steps of the methods described as being as being performed. Accordingly, some, but not all embodiments are directed to a device, e.g., communications device, with a processor which includes a module corresponding to each of the steps of the various described methods performed by the device in which the processor is included. In some but not all embodiments a device, e.g., a communications device, includes a module corresponding to each of the steps of the various described methods performed by the device in which the processor is included. The modules may be implemented using software and/or hardware.

While described in the context of an OFDM system, at least some of the methods and apparatus of various embodiments, are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A wireless communications device, comprising:
a first antenna being polarized in a first direction;
a first receiver processing module coupled to said first antenna;
a second antenna being polarized in a second direction, said second direction being at least 45 degrees apart from said first direction;
a second receiver processing module coupled to the second antenna;
a signal combining module for combining a first signal recovered by said first receiver processing module and a second signal recovered by said second receiver processing module;
a third antenna being polarized in a third direction which is at least 45 degrees apart from said first and second directions; and
a third receiver processing module coupled to said third antenna.

2. The wireless communication device of claim 1,
wherein said first receiver processing module is a first RF processing module; and
wherein said second receiver processing module is a second RF processing module.

3. The wireless communications device of claim 2, wherein said first direction is 90 degrees from said second direction.

4. The wireless communications device of claim 3, wherein said third direction is 90 degrees from said first and second directions.

5. The wireless communications device of claim 3, wherein said combining module is a maximal ratio combining module.

6. The wireless communications device of claim 3, wherein said combining module is a minimum mean square combining module.

7. The wireless communications device of claim 3, wherein the first and second antenna are dipole antennas.

8. The wireless communications device of claim 1, wherein said communications device is a portable handheld communications device.

9. A method of operating a wireless communications device, comprising:
receiving a first signal on a first antenna polarized in a first direction;
processing the received first signal using a first receiver processing module to generate a first digital signal;
receiving a second signal on a second antenna polarized in a second direction, said second direction being at least 45 degrees apart from said first direction;
processing the second received signal to generate a second digital signal;
combining the first digital signal and the second digital signal to recover a first transmitted signal,
receiving a third signal on a third antenna polarized in a third direction which is at least 45 degrees apart from said first and second directions; and
processing the received third signal to generate a third digital signal.

10. The method of claim 9,
wherein processing of the received first signal includes performing a first filtering and first sampling operation; and
wherein processing of the received second signal includes performing a second filtering and second sampling operation.

11. The method of claim 10, wherein said first direction is 90 degrees from said second direction.

12. The method of claim 11,
wherein said third direction is 90 degrees from said first and second directions.

13. The method of claim 11, wherein said combining includes performing a maximal ratio combining operation on the first and second signals.

14. The method of claim 11, wherein said combining includes performing a minimum mean square combining operation.

15. The method of claim 11, wherein the first and second antennas are dipole antennas.

16. The method of claim 9, wherein said communications device is a portable handheld communications device.

17. A wireless communications device, comprising:
first antenna means for receiving a first signal polarized in a first direction;
first receiver means for processing the received first signal to generate a first digital signal;
second antenna means for receiving a second signal polarized in a second direction, said second direction being at least 45 degrees apart from said first direction;
second receiver means for processing the second received signal to generate a second digital signal;
means for combining the first digital signal and the second digital signal to recover a first transmitted signal;
third antenna means for receiving a third signal polarized in a third direction which is 45 degrees apart from said first and second directions; and
third signal processing means for processing the received third signal to generate a third digital signal.

18. The wireless communications device of claim 17, wherein said first direction is 90 degrees from said second direction.

19. The wireless communications device of claim 18,
wherein said third direction is 90 degrees from said first and second directions.

20. A computer readable medium embodying machine executable instructions for controlling a wireless communications device to implement a method, the method comprising:
receiving a first signal on a first antenna polarized in a first direction;
processing the received first signal using a first receiver processing module to generate a first digital signal;
receiving a second signal on a second antenna polarized in a second direction, said second direction being at least 45 degrees apart from said first direction;
processing the second received signal to generate a second digital signal;
combining the first digital signal and the second digital signal to recover a first transmitted signal;
receiving a third signal on a third antenna polarized in a third direction which is at least 45 degrees apart from said first and second directions; and
processing the received third signal to generate a third digital signal.

21. The computer readable medium of claim 20,
wherein processing of the received first signal includes performing a first filtering and first sampling operation; and wherein processing of the received second signal includes performing a second filtering and second sampling operation.

22. The computer readable medium of claim 21, wherein said first direction is 90 degrees from said second direction.

23. The computer readable medium of claim 21, wherein said third direction is 90 degrees from said first and second directions.

24. A wireless communications device comprising:
a processor configured to control said device to:
receive a first signal on a first antenna polarized in a first direction;
process the received first signal using a first receiver processing module to generate a first digital signal;
receive a second signal on a second antenna polarized in a second direction, said second direction being at least 45 degrees apart from said first direction;
process the second received signal to generate a second digital signal;
combine the first digital signal and the second digital signal to recover a first transmitted signal;
receive a third signal on a third antenna polarized in a third direction which is at least 45 degrees apart from said first and second directions; and
process the received third signal to generate a third digital signal.

25. The wireless communications device of claim 24,
wherein processing of the received first signal includes performing a first filtering and first sampling operation; and
wherein processing of the received second signal includes performing a second filtering and second sampling operation.

26. The wireless communications device of claim 25, wherein said first direction is 90 degrees from said second direction.

27. The wireless communications device of claim 25, wherein said third direction is 90 degrees from said first and second directions.

* * * * *